United States Patent
Choi

(10) Patent No.: US 11,188,541 B2
(45) Date of Patent: Nov. 30, 2021

(54) JOIN METHOD, COMPUTER PROGRAM AND RECORDING MEDIUM THEREOF

(71) Applicant: INDUSTRY ACADEMIC COOPERATION FOUNDATION OF YEUNGNAM UNIVERSITY, Gyeongsangbuk-do (KR)

(72) Inventor: Gyu Sang Choi, Suseong-gu Daegu (KR)

(73) Assignee: INDUSTRY ACADEMIC COOPERATION FOUNDATION OF YEUNGNAM UNIVERSITY, Gyeongsangbuk-Do (KR)

(*) Notice: Subject to any disclaimer, the term of this patent is extended or adjusted under 35 U.S.C. 154(b) by 358 days.

(21) Appl. No.: 16/343,040

(22) PCT Filed: Oct. 20, 2017

(86) PCT No.: PCT/KR2017/011703
§ 371 (c)(1),
(2) Date: Apr. 18, 2019

(87) PCT Pub. No.: WO2018/074906
PCT Pub. Date: Apr. 26, 2018

(65) Prior Publication Data
US 2019/0391974 A1    Dec. 26, 2019

(30) Foreign Application Priority Data

Oct. 20, 2016  (KR) .................. 10-2016-0136520
Oct. 20, 2017  (KR) .................. 10-2017-0136754

(51) Int. Cl.
*G06F 17/00*   (2019.01)
*G06F 16/2455* (2019.01)
(Continued)

(52) U.S. Cl.
CPC ........ *G06F 16/2456* (2019.01); *G06F 16/137* (2019.01); *G06F 16/2255* (2019.01); *G06F 16/2453* (2019.01); *G06F 16/284* (2019.01)

(58) Field of Classification Search
None
See application file for complete search history.

(56) References Cited

U.S. PATENT DOCUMENTS 6,067,547 A * 5/2000 Douceur ............. G06F 16/2255
2006/0235903 A1 * 10/2006 Kapur .................... G06F 16/93
(Continued)

FOREIGN PATENT DOCUMENTS

JP    2009042869 A    2/2009
JP    2010117951 A    5/2010
(Continued)

OTHER PUBLICATIONS

International Search Report, PCT/KR2017/011703 dated Mar. 6, 2018.
(Continued)

*Primary Examiner* — Hasanul Mobin
(74) *Attorney, Agent, or Firm* — Porzio Bromberg & Newman P.C.

(57) ABSTRACT

A Join method in a database management system according to an embodiment of the invention comprises: in a memory of a storage medium, which processes data stored within a computer memory, when a new record is added to a bucket of a first table including only a basic key of another table, dividing the bucket in a case where there is no free space in the bucket; and on the basis of a fact that at least one bit of each of the new record and a first record having existed in the bucket before the dividing thereof is different from an upper bit thereof, storing one of the first record and the new record in the divided bucket.

5 Claims, 8 Drawing Sheets

(51) Int. Cl.
*G06F 16/28* (2019.01)
*G06F 16/22* (2019.01)
*G06F 16/13* (2019.01)
*G06F 16/2453* (2019.01)

(56) References Cited

U.S. PATENT DOCUMENTS

| | | | | |
|---|---|---|---|---|
| 2006/0288030 A1* | 12/2006 | Lawrence | ........... | G06F 16/2456 |
| 2008/0068963 A1* | 3/2008 | Shikata | ............. | G11B 20/1217 |
| | | | | 369/84 |
| 2010/0293338 A1* | 11/2010 | Krishnaprasad | .... | G06F 16/9014 |
| | | | | 711/136 |
| 2011/0196898 A1* | 8/2011 | Hiyori | ................ | G06F 16/2456 |
| | | | | 707/803 |
| 2011/0225168 A1* | 9/2011 | Burroughs | .......... | H04L 45/7453 |
| | | | | 707/747 |
| 2012/0109888 A1* | 5/2012 | Zhang | .................. | G06F 16/278 |
| | | | | 707/610 |
| 2014/0006362 A1* | 1/2014 | Noronha | ............... | G06F 3/0689 |
| | | | | 707/692 |
| 2014/0006379 A1* | 1/2014 | Arndt | ................ | G06F 16/24544 |
| | | | | 707/714 |
| 2015/0347559 A1* | 12/2015 | Elias | ................... | G06F 16/9024 |
| | | | | 707/737 |
| 2017/0090814 A1* | 3/2017 | Yeung | ................... | G06F 3/0638 |
| 2017/0308578 A1* | 10/2017 | Chen | ..................... | G06F 16/284 |
| 2018/0096048 A1* | 4/2018 | Kondiles | ................. | G06F 16/25 |

FOREIGN PATENT DOCUMENTS

| | | |
|---|---|---|
| KR | 1020150038220 A | 4/2015 |
| KR | 1020160074193 A | 6/2016 |

OTHER PUBLICATIONS

Shim "A Skewed Data Handling Method Using Spatial Bash Join 1-6 Algorithm", Proceedings of Korea [nstitute ofinfmrnation Sc1enllsts and Engrneers Conforence 3 I ( I B ), pp. 19-21, Apr. 2004 <URL: http://www.dbpia.co .kr/Jonmal/ Article Detail/NOD E0062 87 65 > See pp. 1 9-21.

Kim, Kang-Mok et al., "Advanced Bash Join Scheme for In-Memory Database", Proceedings or Korea Institute of information Scientisls and Engineers Conference, pp. l77-179,Jun. 2017 <URL:http://www.dbpia.co.kr/Journal/A_rticleDetail/NODE07207173) See pp. J 77-179.

\* cited by examiner

| Identifiers | Binary representation |
|---|---|
| A0 | 100 000 |
| A1 | 100 001 |
| B0 | 101 000 |
| B1 | 101 001 |
| C0 | 110 000 |
| C1 | 110 001 |
| C2 | 110 010 |
| C3 | 110 011 |
| C5 | 110 101 |

JOIN METHOD, COMPUTER PROGRAM AND RECORDING MEDIUM THEREOF

TECHNICAL FIELD

The present disclosure relates to a join method. More specifically, the present disclosure provides the join method with improved computation performance compared to the related art by performing join operation after sorting records, not performing sorting or hashing on a table having a primary key but performing sorting or hashing on a table without a primary key when applying a join method, a computer program for executing the same, and a recording medium.

BACKGROUND ART

A Join operation is an operation that combines two or more tables into a set. For example, if two or more tables are listed in the FROM clause of an SQL statement, the Join operation can be performed. Such the Join operation is performed between two selected tables from two or more tables.

Among the Join operation, a Hash Join algorithm is used to join two tables containing large amounts of data. In particular, the Hash Join algorithm has the advantage that the Join operation can be performed by processing a part of the data in a memory and then storing again in a storage device since not all tables can be stored in a memory because of the large size.

A conventional Hash Join technique will be briefly described as follows.

Assuming the main memory size is 32 KB, the memory space is classified into R Table area (8 KB), S Table area (8 KB), Input buffer (4 KB), Output buffer (4 KB) and other areas (8 KB). For convenience, R Table area, S Table area, input buffer, output buffer, and other memory areas are denoted by M R, M S, M I, M O, M H, respectively. M H can be used for various purposes, for example, M H stores a Hash table in Grace Hash Join and Hybrid Hash Join.

R Table has a schema of <Employee_ID, Department_ID> and S Table has a schema of <Department_ID, Department_Name>. In R Table, Employee_ID is the primary key and Department_ID is the foreign key. In S Table, Department_ID is the primary key of S Table, and Department_Name is value.

Therefore, the Join operation is performed by a query, Select R.Employee_ID, S.Department_ID, S.Department_Name from R, and S where R.Department_ID=S.Department_ID.

After the Join operation, the result of the Join operation is temporarily stored in the output buffer area M O of the main memory, and when the output buffer M O is full, it is flushed to the hard disk. Each record of the Join operation result will consist of <Employee_ID, Department_ID, Department_Name>.

However, in the conventional Hash Join method, there is a problem that all the records in each directory entry are compared for the Join operation, which requires a long computation time.

SUMMARY OF INVENTION

Technical Problem

The present disclosure has been devised to solve the problems described above and to provide a Join method for more efficient performance of a Hash Join operation when scan (search) a Hash map after generating a Hash map, a computer program for executing the same, and a recording medium.

Solution to Problem

A Join method in a database management system according to an embodiment of the disclosure includes dividing a bucket if there is no free space in the bucket when a new record is added to the bucket of a first table including only a basic key of another table; and storing one of the first record and the new record in the divided bucket, on the basis of a fact that at least one bit of each of the new record and a first record having existed in the bucket before the dividing thereof is different from an upper bit thereof, wherein the database management system is for a memory of a storage medium, which processes data stored within a computer memory.

The Join method in the database management system further includes: performing a Join operation with the records in a second table and the first table by reading the buckets of the first table in order.

The Join method, when performing the Join operation, includes: probing utilizing the records in the second table, after reading the records in the buckets of the first table if the records in the bucket are not sorted at the time of performing Join operation.

The Join method, when performing the Join operation, includes performing a merge operation with the record in the second table after reading the first table per bucket if the records in the bucket are sorted, at the time of performing the Join operation.

The Join method includes: judging that at least one or more bits are the same in order from the upper bit value to the lower bit.

A recording medium according to an embodiment of the present disclosure is readable by a digital processing apparatus, tangibly embodying a program of instructions executable by a digital processing apparatus, in order to perform the Join method described above.

Effects of the Invention

A Join method using the sorting operation according to an embodiment of the present disclosure, the computer program, and the recording medium thereof can eliminate the overhead of Hashing which is applied twice in the conventional Hybrid Hash Join technique, thus reduce the time for Probing. As a result, the amount of computation of Hash Join can be reduced compared with the conventional technique so that the time required for Hash Join can be shortened.

METHOD FOR CARRYING OUT THE INVENTION

Figures 1, 2:
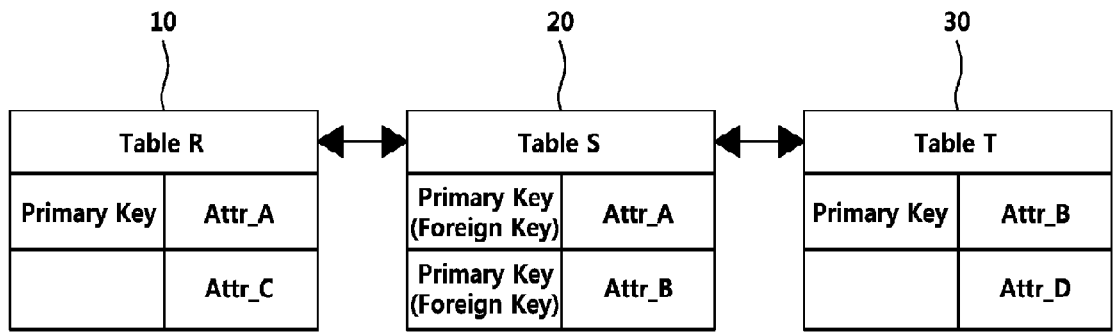
FIG. 1 is a diagram showing the schema of R table, S table and T table according to an embodiment of the present disclosure.
FIG. 2 is a diagram showing binary representation of data used in dynamic Hashing according to an embodiment of the present disclosure

The technical terms used herein are used only to describe specific embodiments and are not intended to limit the present disclosure. In addition, the technical terms used in the present disclosure is not to be construed in a sense generally understood by a person having ordinary skill in the art to which the present disclosure belongs, unless otherwise defined in the present disclosure, is not to be construed to mean, or be interpreted in an excessively broad sense or excessively reduced sense. In addition, when a technical term used in the present disclosure is an erroneous technical term that does not accurately express the concept of the present invention, it is to be understood with replaced technical term that can be understood by a person skilled in the art. In addition, the general terms used in the present invention are to be interpreted according to a predefined or in the context, and not be construed as being excessively reduced.

In addition, the singular forms used in the present disclosure include singular and plural referents unless the context clearly indicates otherwise. In the present disclosure, the terms such as "comprising" or "including" and the like are not be construed as necessarily including the various elements described in the disclosure or various steps, and it is to be interpreted that some of the elements or some of the steps may not be included, or may include additional elements or steps.

Hereinafter, exemplary embodiments of the present disclosure will be described in detail with reference to the accompanying drawings, wherein the same or similar elements are denoted by the same reference numbers regardless of the reference numbers in the drawings, and duplicate explanations thereof will be omitted.

In the following description, descriptions of features that are known in the art may be omitted in case it would obscure the disclosure with unnecessary details. The accompanying drawings are only for the purpose of facilitating understanding of the present disclosure, and are not be construed as limiting the scope of the present disclosure with reference to the accompanying drawings.

FIG. 1 is a diagram showing the schema of R, S and T tables according to an embodiment of the present disclosure. Attr_A in R table is a primary key, and the primary key value of all records in R Table is unique. Here, Attr is a method to load or set an attribute value. A primary key is a column that uniquely distinguishes one record from a large number of records in a table. Specifically, the primary key is the attribute value used to identify a record or tuple is a key used to identify a record or tuple in one sense. the primary key Attr_A is not allowed to be duplicated. However, since Attr_C is not a primary key, duplication is allowed.

Similarly, Attr_B in T table is a primary key, and the primary key value of all records in R Table are unique. That is, duplication is not allowed. However, because Attr_D is not a primary key, duplication is allowed. S Table includes Attr_B and Attr_A, and are the primary keys of tables T and R, respectively. That is, in S Table, the combination of Attr_B and Attr_A is the primary key. Therefore, the values of Attr_B and Attr_A are allowed to be individually duplicated, but the combination of Attr_A and Attr_B is unique.

Additionally, in most cases, the primary key remains sorted in the database. That is, managed in ascending or descending order. Therefore, it can be assumed that the primary key value of R Table is already sorted. In this case, it may be beneficial for performance not to use the Hash of the records in R Table for the Join operation.

However, in S Table, the records are not sorted, and the value of Attr_A can be duplicated. Therefore, a technique such as hashing or sorting is applied to S Table.

The technique used in the present disclosure is similar to Dynamic Hashing, but in Dynamic Hashing, the Hash value is applied after Hashing. However, in the present disclosure, the value of Attr_A of S Table is applied immediately. Also, in Dynamic Hashing, the lower bit value is used first and the upper bit is used gradually. However, in the present disclosure, the upper bit value is used first, and the lower bit is used gradually.

Figure 3:
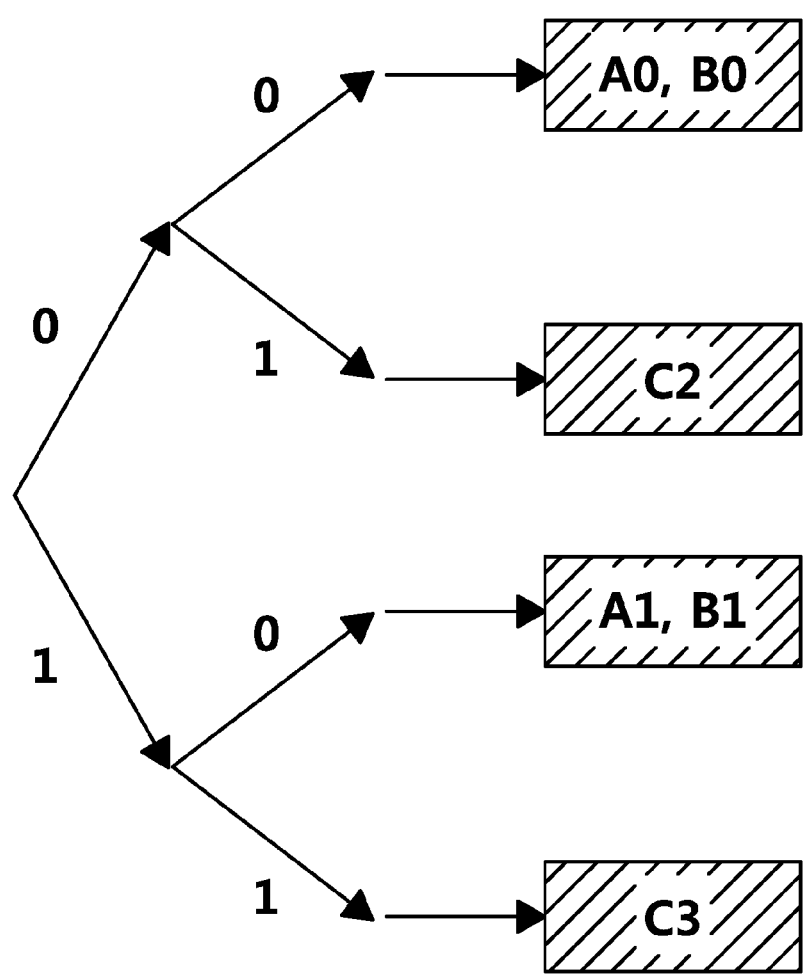
FIG. 3 is a diagram showing an initial state of dynamic Hashing according to an embodiment of the present disclosure.

FIG. 2 is a diagram showing binary representation of data used in dynamic Hashing according to an embodiment of the present disclosure, and FIG. 3 is a diagram illustrating an initial state of dynamic Hashing according to an embodiment of the present disclosure.

A bucket can store two records. If records are to be added to the bucket which is full, the bucket is divided and the records are stored in divided buckets. Records are stored in divided buckets considering one more bit from the record to the records in the previous bucket before being divided and the newly added records.

Figure 4:
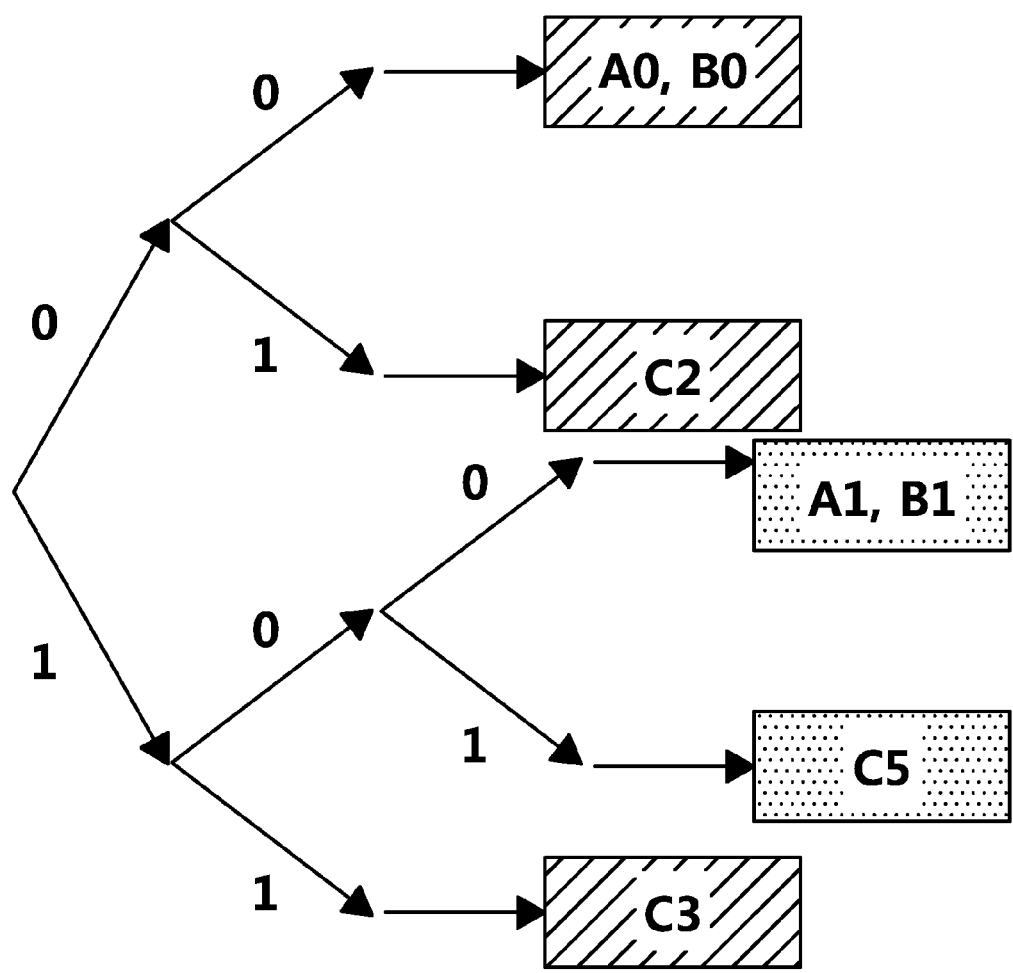
FIG. 4 is a diagram showing a state in which a first record is added according to an embodiment of the present disclosure.

As shown in FIG. 2 and FIG. 3, when the first record C5 is added, the records A1 and B1 which were in the existing bucket, the records of which the second lower bit is 0 and the first lower bit is 1 (that is, the lower binary representation bits '001') are stored in the corresponding bucket as shown in FIG. 2. However, since there is no space in the bucket when C5 is to be added, the bucket containing A1 and B1 is divided, as shown in FIG. 4.

That is, when storing the record in the bucket, the third lower bit is considered. Therefore, A1 and B1 which represented the lower bits 001 are stored in the same bucket, and C5 which represented the lower bits 101 is stored in different buckets.

At this time, records in the bucket are not sorted. In order to easily add a record to a bucket, a bitmap can be used for finding assigned slots and empty slots in a very short time.

For example, when there are slots that stores 8 records in a bucket, without bitmap, slots are checked from the first slot whether the slot is empty, until the empty slots are found. However, with a bitmap, eight bits are sufficient for eight slots. Therefore, the value of 8 bits can immediately find out which slots are empty, thereby shortening the time for finding out empty slots.

In the method of the present disclosure, S Table which includes only the primary keys of other tables is not sorted, and sorting is performed per bucket using Dynamic Hashing. In this way, only the records with the minimum value exist in the top-leveled bucket in Dynamic Hashing.

Therefore, a Join operation is performed by reading records in the first part of R Table. That is, since R Table is already sorted, the records read from R Table are sorted, and only the records having the minimum value exist in the bucket read from the Dynamic Hashing of S Table.

Thus, joining the records in these two areas is done in a very short time. That is, one record can be read from the bucket of S Table and a foreign key of the record can be retrieved from the record read from R Table using binary search.

Here, the foreign key is a key which the attribute or attribute set belonging to a relation becomes the primary key of another relation. In other words, the set of attributes that refer to the primary key of another relation is the foreign key. The foreign key is needed to correctly represent the relationship between the relations.

Before the probing operation, the records in the bucket of S Table may be sorted. In this case, there is an overhead to be sorted, but a Merge Sort technique can be applied when performing a probing.

A Merge Sort is a method that divides the given data into several parts, thereafter recursively sorts each of them, and combines the two parts into one. If the records are not sorted in the bucket of S Table, binary search operation is applied to the records in R Table.

Figure 5:
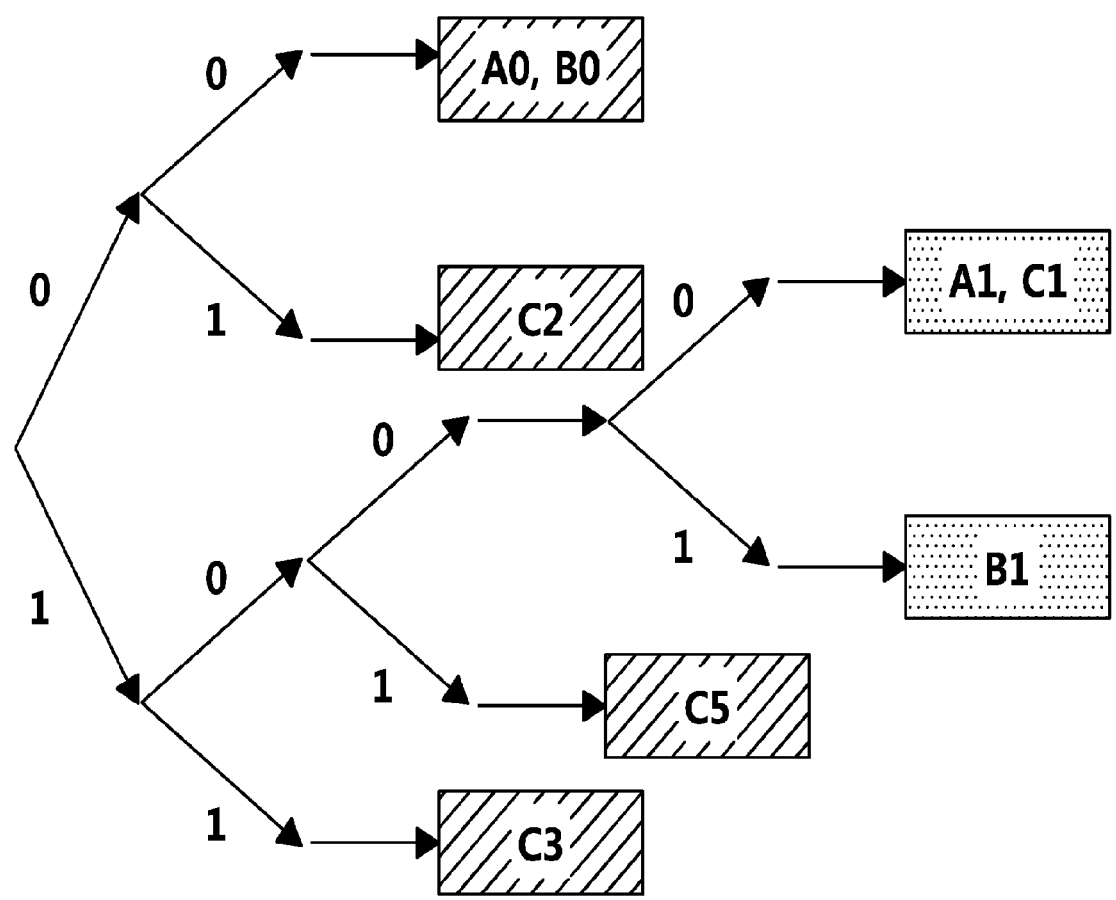
FIG. 5 is a diagram showing a state in which a second record is added according to an embodiment of the present disclosure.

FIG. 4 is a diagram illustrating a state in which a first record is added according to an embodiment of the present disclosure, and FIG. 5 is a diagram showing a state in which a second record is added according to an embodiment of the present disclosure.

Figure 6:
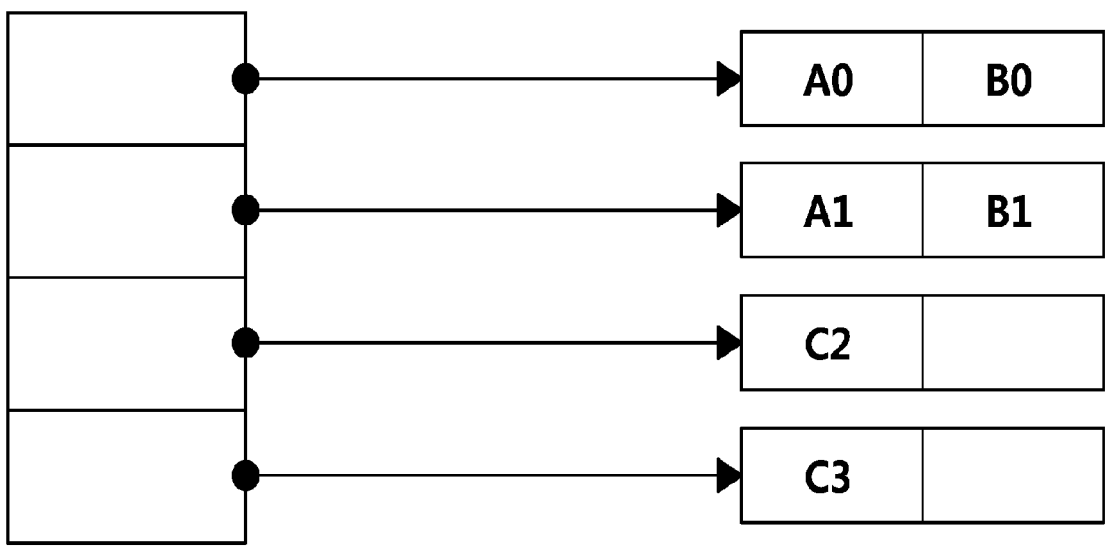
FIG. 6 is a diagram illustrating an initial state of Extendible Hashing according to an embodiment of the present disclosure.
Figure 7:
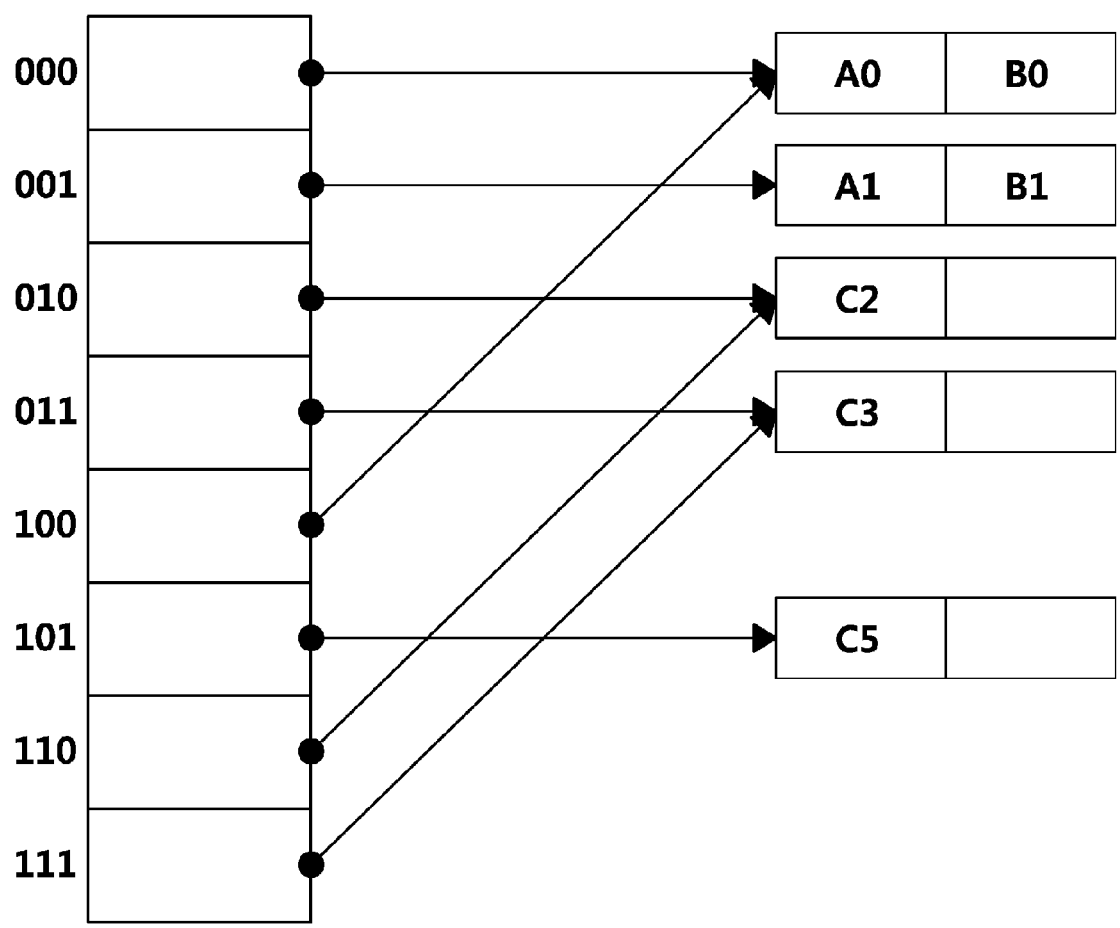
FIG. 7 is a diagram showing a state of Extendible Hashing after the first record is added according to an embodiment of the present disclosure.

FIG. 6 is a diagram illustrating an initial state of an Extendible Hashing according to an embodiment of the present disclosure, and FIG. 7 is a diagram illustrating a applied state of Extendible Hashing after a first record is added according to an embodiment of the present disclosure.

When the record A1 and B1 are included in a bucket which is 2 lower bits <01> and the record C5 is added as shown in FIG. 4, the record A1 and B1 and the record C5 have the same lower bits in the bucket <01>, but classified based on the difference of the third lower bits <101> and <001>.

That is, as shown in FIG. 2, three lower bits <001> of the records A1 and B1 are identical to each other, and three upper bits are the same up to first and second upper bits <'10'0> and <'10'1>. And the three lower bits of C5 are 101, thus can be classified as shown in FIG. 4.

In addition, when the records A1 and B1 are included in one bucket which is the lower bits <001> and the record C1 is added as shown in FIG. 5, the records A1 and C1 and the record B1 have the same lower bits <001>, but classified based on the difference of the upper bits.

That is, as shown in FIG. 2, the lower bits of the records A1 and C1 are identical to each other as <001>, and the upper bits are the same up to first upper bit '0'. And the lower bits of B1 are 1001, thus can be classified as shown in FIG. 5.

Although the above embodiments described the example a record is added by comparing bitwise, but the record may be added by comparing in multiple bit unit according to another embodiments.

Dynamic Hashing is classified as directory and directory-less dynamic Hashing. In the directory-less Dynamic Hashing, a binary tree is used instead of a directory. The directory dynamic Hashing is directory-based dynamic Hashing, a typical example of which is Extendible Hashing.

FIG. 6 is an initial state of extendible Hashing. In Extendible Hashing technique, if C5 is to be added, it is stored in a bucket containing A1 and B1. However, since the bucket in which A1 and B1 are stored does not have any free space (full), the size of the directory might extend to twice for adding C5.

That is, the directory of FIG. 6 has four entries, but the directory of FIG. 7 extends to eight entries. Then, the bucket in which stores A1 and B1 and identified by the lower bits <001> is divided so that A1 and B1 are stored in one bucket identified by the lower bits <001>, and C5 is stored in another bucket identified by the lower bits <101>. The directory entry 001 is connected to the bucket storing A1 and B1, and the directory entry 101 is connected to the bucket in which C5 is stored. Then, the remaining buckets are not divided.

However, because the size of the directory has doubled, the directory entry <000> and the directory entry <100> point to the bucket which stores A0 and B0. That is, the two directory entries share the same bucket. If new record is added to the bucket, the present bucket is divided as described above and the divided bucket is connected to the directory entry 000 and the directory entry 100, respectively. In this way, the size of the directory can be changed dynamically based on the number of records in the Extendible Hashing.

Figure 8:
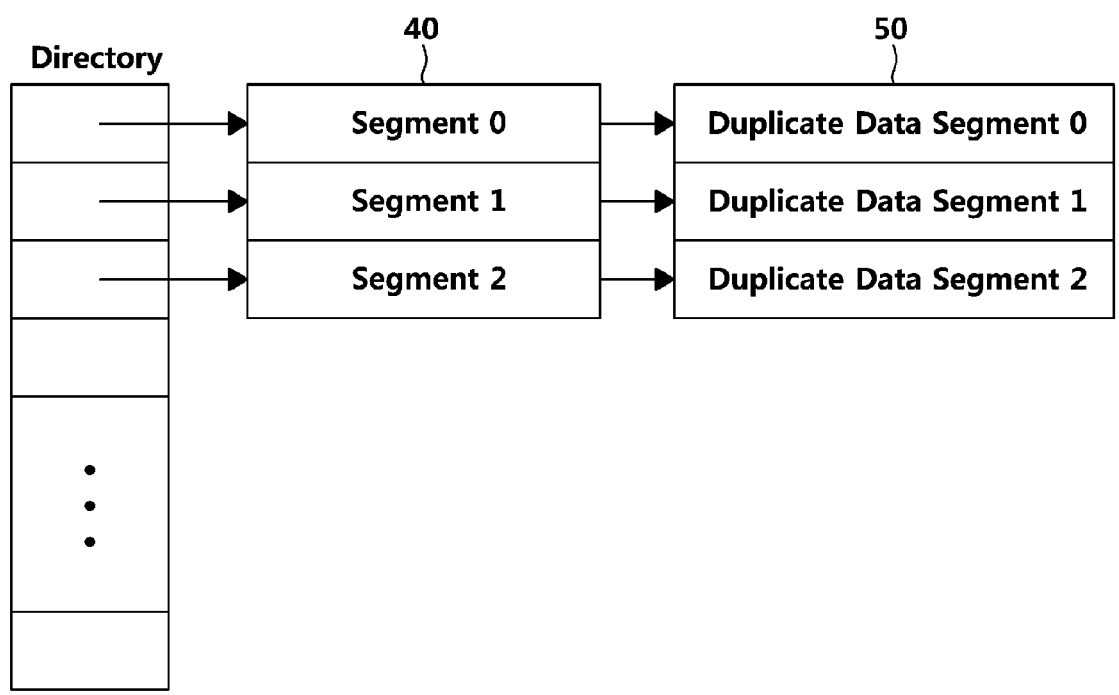
FIG. 8 is a diagram showing a case where there is a plurality of records having duplicate keys according to an embodiment of the present disclosure.

FIG. 8 is a diagram showing a case where there is a plurality of records having duplicate keys according to an embodiment of the present disclosure. Referring to FIG. 8, when A0 and B0 records are included in one bucket 40 and a new record having the same value as the primary key of A0 among the records in the bucket 40 is to be added, a new bucket 50 is assigned, a new record having the same value as the primary key of A0 is added to the new bucket 50, and the new bucket 50 is connected to the bucket 40.

Figure 9:
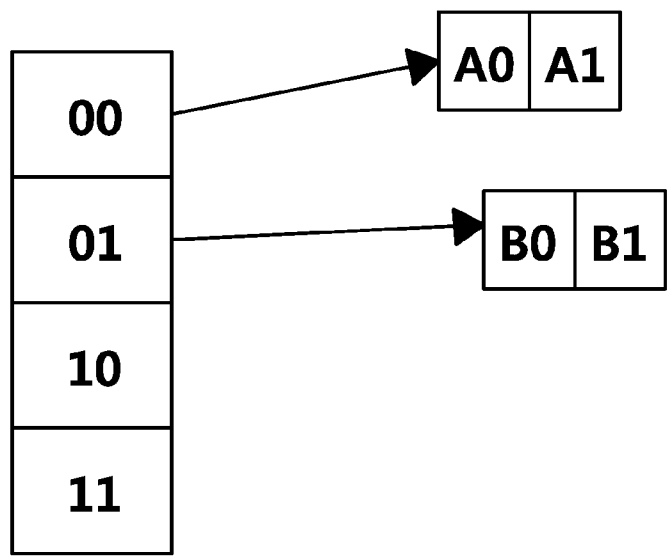
FIG. 9 is a diagram illustrating a dynamic Hashing structure using a directory according to another embodiment of the present disclosure.

FIG. 9 is a diagram illustrating a Directory Dynamic Hashing structure according to another embodiment of the present disclosure. FIG. 2 assumes that the identifier which is shown to describe a Dynamic Hashing structure using a directory and the Hashing key which is the result value of the Hash function are represented in binary. FIG. 9 assumes that up to two pieces of data can be inserted into each bucket.

A well-known Dynamic Hashing Operation checks the least significant bit of a Hash key in order to insert the identifier into the Hash table structure, whereas the embodiment of FIG. 9 constructs a Hash table by checking the most significant bit Referring to FIG. 2 and FIG. 9, since the most significant bit value of the identifiers A0 and A1 is 1, A0 and A1 are inserted in the same directory 1. Since the most significant bit of the identifier B0 is 1, B0 is inserted in the directory 1, but the collision occurs because the number of data is over the maximum number into one bucket.

In this case, depending on whether the value of the second most significant bit is 0 or 1, the size of the directory might be changed and the contents of the bucket are to be readjusted. At this time, the identifiers A0, A1, and B0 are checked for the third upper bit because the bit values are the same up to the first and second upper bit. Since the third upper bit value of the identifiers A0 and A1 is 0 and the third most significant bit value of B0 is 1, the Hash table has a form as shown in FIG. 9.

The Dynamic Hash structure described in FIG. 9 can be used to implement an advanced Hash Join algorithm. Among R Table and S Table in FIG. 1, S Table is configured as Dynamic Hash table. When inserting a record into S Table, the foreign key of the record is used as the Hash key value. Here, the bit string is checked every 4 bits to prevent degradation of performance caused by frequent directory size changes. Therefore, the number of directories is also readjusted to 16 units.

A node of the directory includes a first bucket containing unique records, a second bucket containing duplicate records, and a pointer pointing to the next directory. When a record is inserted, if a record with the same key value is already inserted in the first bucket, the record is stored in the second bucket containing the duplicate record. In this case, the advanced Hash Join algorithm creates a variable that stores the number of duplicated records, and counts how many records in the first or second bucket have the same key value as the key value of the record.

If the first bucket containing a unique record is full, the data in the first bucket is redistributed. During the redistributing process, the buckets of duplicate data might also be divided.

Prior to performing the Join operation, an inorder traversal is performed to find the leaf node of S Table to retrieve the bucket with the records. Then, after retrieving the bucket with the record of the corresponding node, the Join operation is performed with R Table. The Sort operation is performed on the record of the corresponding bucket before joining with R Table. It is advantageous because the execution time is reduced by performing sequential searching of R Table when the Join operation is performed after the Sorting operation. When the primary key of R Table matching the foreign key of S Table is found through the sequential search, the Join operation is performed.

Subsequently, if the corresponding records in S Table have duplicate records, the Join operation is performed on those records as well, searching the second bucket of the duplicated records. When the Join operation for the corresponding bucket is finished, the next bucket is called using the circulation, and the Join operation is performed for the corresponding bucket.

Meanwhile, the Join method according to the above-described embodiments may be implemented as a program and stored in a computer-readable recording medium. The recording medium may be, for example, an electronic, magnetic, optical, electromagnetic, infrared, or semiconductor system, apparatus, or device. More specific examples of the recording medium include a computer diskette (magnetic), a random access memory (RAM) (electronic), a read only memory (ROM) (electronic), an erasable programmable read only memory (EPROM, EEPROM or flash memory) (electronic), optical fiber (optical), digital versatile disc (DVD) or compact disc read-only memory (CDROM). The computer-readable recording medium may also be distributed over a networked computer system and stored and executed in computer-readable code in a distributed manner.

According to the embodiment, the Join method according to the above-described embodiments can be applied to an in-memory database management system. In in-memory database management system, all data is held in main memory rather than on disk.

Thus, data for executing the Join method according to the embodiments described herein may exist in the storage device or the main memory. When the Join method according to the above-described embodiments is applied to the in-memory database management system, since all the data is in the main memory, the Join operation can be performed without reading the data from the storage device.

The features, structures, effects and the like described in the foregoing embodiments are included in at least one embodiment of the present disclosure and are not necessarily limited to one embodiment. Further, the features, structures, effects, and the like illustrated in the embodiments may be combined or modified in other embodiments by those skilled in the art to which the embodiments belong.

Therefore, it is to be understood that these combinations and modifications are comprised in the present disclosure. While the present disclosure has been particularly shown and described with reference to exemplary embodiments thereof, it is clearly understood that the same is by way of illustration and example only and is not to be construed as limiting the scope of the present disclosure. It can be seen that various modifications and applications are possible. For example, each component specifically shown in the embodiments may be modified and implemented. It is to be understood that such variations and applications are to be construed as being comprised within the scope of the present invention as defined by the enclosed claims.

What is claimed is:

1. A Join method in an in-memory database management system comprising:
    using a foreign key as a Hash key when inserting a new record into S table of a Dynamic Hash structure;
    checking a bit string of the Hash key in a predetermined bit unit to readjust the number of directories;
    redistributing the data in the bucket according to the readjusted number of the directories;
    performing an in order data traversal to call a bucket having an overlapping record among the buckets; and
    performing a Join operation with R table after retrieving the record bucket of the corresponding node in the S table,
    wherein the directory includes a bucket containing unique records, a bucket containing duplicate records, and a pointer, and
    wherein the redistributing step includes storing the new record in the bucket containing duplicate records and counting the number of duplicate records if the new record is duplicated with the previously stored record in the directory.

2. The join method of claim 1, wherein the redistributing the data,
    redistributes the bucket containing duplicated data as well, when the bucket containing unique records is full and to be redistributed.

3. A Join method in an in-memory database management system comprising:
    using a foreign key as a Hash key when inserting a new record into S table of a Dynamic Hash structure;
    checking a bit string of the Hash key in a predetermined bit unit to readjust the number of directories;
    redistributing the data in the bucket according to the readjusted number of the directories;
    performing an in order data traversal to call a bucket having an overlapping record among the buckets; and
    performing a Join operation with R table after retrieving the record bucket of the corresponding node in the S table wherein performing the Join operation comprises:
        retrieving a record bucket of the corresponding node from S table;
        performing a Sorting operation on a record of the corresponding bucket; and
        performing a Join operation when the primary key of the R Table matching the foreign key of S table is found.

4. The Join method of claim 3, performing a Join operation searching the bucket of the duplicate record, if the new record of S table overlaps the record which is previously stored.

5. The Join method of claim 1,
wherein in the Join method is only executed in a main memory of a computer system including the main memory and an external memory.

\* \* \* \* \*